Feb. 14, 1961 J. R. VILLE 2,972,118

BLOCKING OSCILLATOR CIRCUIT

Filed Nov. 18, 1958

INVENTOR
JULES R. VILLE
BY Spencer E. Olson
ATTORNEY 2,972,118
Patented Feb. 14, 1961

2,972,118

BLOCKING OSCILLATOR CIRCUIT

Jules R. Ville, Buffalo, N.Y., assignor, by mesne assignments, to Sylvania Electric Products Inc., Wilmington, Del., a corporation of Delaware Filed Nov. 18, 1958, Ser. No. 774,763

5 Claims. (Cl. 331—149)

This invention relates to electrical circuits, and more particularly to means for synchronizing a relaxation oscillator, such as a blocking oscillator.

Heretofore it has been the practice in the synchronization of a free-running blocking oscillator to force fire the oscillator tube by applying a large pulse to its grid. To effect force firing this synchronizing pulse must be of an amplitude sufficient to bring the grid up to a level to cause conduction, the consequence being that the peak power of the triggering pulse is almost the same as is necessary to operate the blocking oscillator. The power requirement is large because the voltage is developed across the low impedance of the grid winding of the pulse transformer, whereby a large current is required. Using this method, it is difficult to force fire the tube immediately following a natural firing, and further, that portion of the charge on the timing capacitor at the instant of forced firing is remembered and added, therefore stretching the first period following forced firing. Exact synchronization is not achived, and a powerful source of energy, such as another blocking oscillator, is required to raise the grid to the cut-on level.

Another practice has been to apply a synchronizing pulse to the plate circuit of the blocking oscillator, but this suffers the same shortcomings, namely unreasonable amounts of power and difficulties in forced firing immediately following a natural firing of the circuit.

An object of this invention is to provide means for synchronizing a free-running blocking oscillator which does not require a source of high power.

Another object of the invention is to provide a free-running blocking oscillator whose period, following application of a synchronizing pulse, is essentially equal to the natural period of the oscillator.

Briefly, in accordance with one aspect of the invention, the timing circuit of the oscillator is clamped at a predetermined level such that the timing circuit loses its history at the clamping level, whereby the first period following forced firing is equal to or only slightly shorter than the natural period of the oscillator.

According to another feature of the invention, a gating waveform of suitable polarity is applied to the grid circuit of the blocking oscillator to inhibit the natural rise of the timing waveform. The gating waveform has a period sufficiently long to bring the potential of the timing circuit down to the predetermined clamping level. The gating signal is applied to the oscillator at a time such that its trailing edge occurs one full natural period of the blocking oscillator before the first output pulse from the blocking oscillator is required.

Figure 1:
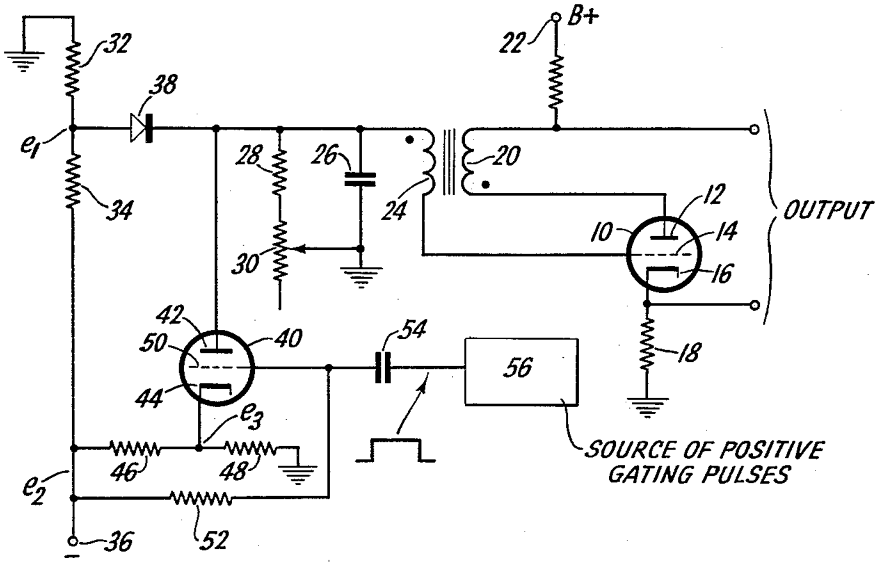
Figure 2:
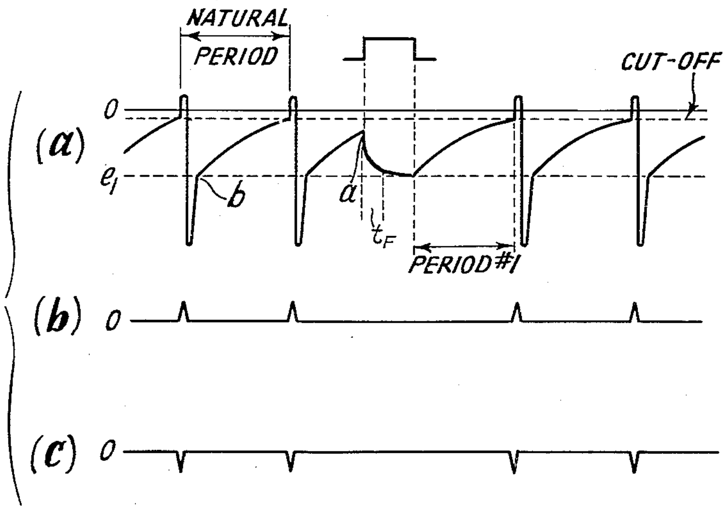

Other objects and features of the invention will be best understood from the following description, reference being had to the accompanying drawings, wherein:

Fig. 1 is a circuit diagram of the blocking oscillator in accordance with the invention; and Figs. 2A, 2B and 2C are a set of curves illustrating certain features of operation of the circuit of Fig. 1.

In idealized form, as illustrated in Fig. 1, the present circuit consists of a free-running blocking oscillator including a triode 10 having a plate 12, a grid 14, and a cathode 16 connected to ground through resistor 18. Plate 12 is connected through one winding 20 of a pulse transformer to a suitable source of positive voltage, indicated at terminal 22. The grid 14 is connected through a second winding 24 of the transformer and through a timing condenser 26 to ground. Also connected to the grid 14, in parallel with condenser 26, is resistor 28 and potentiometer 30, the movable tap of the latter being connected to ground. Condenser 26 and resistors 28 and 30 together determine the discharge time, and hence the natural period of the oscillator, the period being adjustable by the potentiometer 30.

To alleviate a first long period following forced firing, a grid clamping network consisting of resistors 32 and 34 serially connected between ground and a source of negative potential at terminal 36, and a diode 38 connected between the junction of resistors 32 and 34 and the ungrounded plate of condenser 26, is provided. The voltage divider action of resistors 32 and 34 fixes the voltage at the junction at a level designated $e_1$, the parallel resistance of resistors 32 and 34 being small compared to the resistance of timing resistor 28 whereby the grid 14 is rapidly returned to potential $e_1$ through diode 38. If the circuit thus far described is force fired, the first succeeding period following forced firing is only slightly longer than normal and may be made substantially equal to the natural period by decreasing the parallel resistance of resistors 32 and 34 until the forward resistance of diode 38 becomes significant.

In operation, the transformer feeds back energy from the plate to the grid of tube 10, and any change that takes place in the plate circuit will induce a voltage in the grid circuit which will act to aid this change, due to the way in which windings 20 and 24 are coupled. Assuming that the grid condenser 26 has been negatively charged by a preceding cycle, the tube 10, therefore, is biased well below cut-off, cut-off being indicated in Fig. 2A as the horizontal line below or negative a few volts from the zero axis. Immediately following firing (with full charge on condenser 26) condenser 26 is rapidly discharged through diode 38 and resistors 32 and 34 to the clamping level $e_1$, as shown at $b$ in Fig. 2A, considerably below the cut-off potential of tube 10. At this point the timing circuit takes over, and as the remaining charge on condenser 26 leaks off through resistors 28 and 30, the biasing voltage on grid 14 is reduced to the point where the tube begins to conduct. As plate current starts to flow, the magnetic field of plate winding 20 builds up from zero to a maximum in direct proportion to the plate current, and induces a voltage in the grid winding 24. This voltage is impressed upon the grid 14 with a polarity that drives the grid more and more positive as the field in the plate winding is building up. Thus, as shown in Fig. 2A, after initial conduction, the grid voltage increases.

The grid, when driven positive with respect to cathode 16, draws current and electrons accumulate on the ungrounded plate of the timing condenser 26. As the plate current reaches saturation, the field in the plate winding 20 ceases to increase, and for an instant there is no induced voltage on the grid winding 24, and, because no charging potential is applied to condenser 26, the condenser begins to discharge. This discharge causes the potential on the grid to become less positive, causing a reversal in slope of the grid voltage, and thereby causing less plate current to flow in the plate winding 20. The collapsing field in the plate winding induces a voltage in the grid winding in the reverse direction, causing the grid to become more and more negative, which process continues until the grid 14 is driven beyond cut-off, completing a conducting cycle for the tube. Output pulses may be taken from the tube at its plate or cathode, depending upon the polarity desired, positive pulses being obtainable from the cathode as shown in Fig. 2B, and negative pulses being obtainable from the plate circuit, as shown in Fig. 2C.

The circuit thus far described is free-running, and has a natural period determined by the clamping voltage $e_1$ and the time constant of the circuit including condenser 26 and resistors 28 and 30. It is frequently desired, however, to synchronize the action of the blocking oscillator with other events; that is, to initiate the beginning of the timing period at a time to correspond with some external event. As has been briefly discussed earlier, this forced firing has heretofore been accomplished by application of a high power signal to either the plate or the grid circuit of the tube, rapidly to discharge condenser 26 and alter the natural grid waveform. In accordance with the present invention, synchronization is achieved without a high power source, through the application of a gating waveform of suitable polarity to the grid 14 of the blocking oscillator tube. To this end, the second tube 40 is connected in the blocking oscillator circuit to inhibit the natural rise of the timing waveform when it receives the gate. The plate 42 of the tube is connected to the grid circuit of tube 10, and its cathode 44 is connected to the junction of resistors 46 and 48, which resistors are serially connected between the source of negative potential 36 and ground. The grid 50 of tube 40 is biased to a potential designated $e_2$ through resistor 52, resistors 46, 48 and 52 being proportioned such that the voltage $e_2$—$e_3$ biases tube 40 below cut-off between gating pulses. Positive going rectangular gating pulses, of a wave shape shown in Fig. 2A, are applied to the grid of tube 40 through condenser 54 from a suitable source 56.

So long as tube 40 is cut-off, that is, during the periods between gating pulses, it has no effect on the operation of the blocking oscillator circuit. However, upon application of the rectangular gating pulse, of sufficient amplitude to turn tube 40 on hard, condenser 26 is rapidly charged through the tube, thus inhibiting the rise of the waveform to the level indicated at *a* in Fig. 2A at which the grid is at the time of application of the gating pulse. The gating pulse is of at least such duration, and the circuit parameters of tube 40 are so chosen, that sufficient current is drawn through tube 40 during the period of the gating pulse rapidly to bring the potential on condenser 26 back down to the clamping voltage $e_1$. Cathode resistors 46 and 48 are of relatively large value, of the order of several thousand ohms, with the consequence that regardless of how hard the tube is turned on the current drawn by tube 40 is relatively constant, causing little change in the clamping voltage developed across the low impedance source; i.e., resistors 32 and 34 and diode 38. The use of an un-bypassed cathode resistor insures that the circuit has no "memory" to disturb its synchronizing action. The period of the rectangular pulse may be of any arbitrary length greater than the fall time $t_F$, shorter or longer than the natural discharge time of condenser 26, and may be applied at a time such that its leading edge occurs near the middle of the rising grid waveform, although synchronization can be effected even if the rectangular pulse is applied when the grid 14 is almost at turn on potential. Thus, it is seen that the potential on grid 14 is reduced to the level $e_1$ in the early portion of the rectangular pulse, and is maintained at that level throughout the duration of the pulse, which may be as long as several natural periods of the blocking oscillator.

As was noted earlier, conduction of tube 40 brings the potential on condenser 26 down to and maintains it at the level of $e_1$, the level from which the timing circuit controls the discharge during free-running operation.

Consequently, the first period following termination of the gating waveform is substantially equal to the natural period of the blocking oscillator, as indicated on the waveform of Fig. 2A. Thus, the clamping feature of this circuit, in addition to stabilizing the natural period of the blocking oscillator, also aids the synchronizing action. It will be observed from Figs. 2B and 2C that output pulses are absent during the occurrence of the gating pulse, with the first output pulse occurring one full natural period after the trailing edge of the gating pulse.

In a typical circuit, which should be construed as illustrative only, circuit parameters were selected to give the following operating voltages:

| | Volts |
|---|---|
| B+ | 225 |
| $e_1$ | −30 |
| $e_2$ | −100 |
| Amplitude of gating pulse | 30–40 |
| Cut-off voltage of tube **10** | −10 |
| Amplitude of output pulses at cathode of tube **10** | 25–40 |

Of course, it is to be understood that this invention is not limited to the particular details as described above, as many equivalents will suggest themselves to those skilled in the art. For example, voltage values other than those suggested are possible, and by proper selection of other parameters, tubes 10 and 40 can be replaced by suitable transistors. Various other variations will suggest themselves to those skilled in the art which will not necessarily depart from the invention as defined in the appended claims.

What is claimed is:

1. A free-running blocking oscillator comprising a first electron tube having anode, cathode and grid electrodes, a transformer coupling the anode of said first tube to the grid, a timing circuit including a capacitor connected to said control grid operative to cause said control grid to undergo a periodic variation in voltage of which a portion in each cycle rises gradually from a potential below cut-off to a potential level at which said first tube is turned on, followed by an abrupt change to a level well below cut-off, a voltage clamping circuit including a first source of reference potential and a diode connected to said capacitor and operative to rapidly discharge said capacitor from said potential well below cut-off to a higher predetermined potential whereby said portion in each cycle rises gradually from the same potential, and means for synchronizing said blocking oscillator including a second electron tube having anode, cathode and control grid electrodes, means connecting the anode of said second tube to the junction of said diode and said capacitor, means connecting the cathode of said second tube to a second source of reference potential, means normally biasing said second tube to cut-off, and a source of rectangular gating pulses coupled to the control grid of said second tube for rendering said second tube conducting for the duration of said pulses rapidly to change the potential on the control grid of said first tube to and maintain it at said predetermined potential whereby upon cessation of conduction in said second tube the voltage on the control grid of said first tube rises gradually from said predetermined potential to a potential at which it is cut on.

2. A blocking oscillator comprising, a first electron tube having at least an anode and a control grid, a transformer coupling the anode of said first tube to the grid, a resistor-capacitor timing circuit connected to the grid of said first tube and operative in conjunction with said tube and transformer to cause the voltage on said grid to undergo a periodic variation in voltage of which a portion in each cycle rises gradually to the turn-on potential of said first tube followed by an abrupt change to a first level well below cut-off of said first tube, means for rapidly returning the voltage on the grid of said first tube from said first level to a predetermined level intermediate said first level and the cut-off potential of said first tube, said means including a source of voltage and a diode connecting said source of voltage to the capacitor of said timing circuit, and means for synchronizing said blocking oscillator comprising a normally non-conducting device connected from the junction of said diode and said timing circuit to a source of reference potential, and means for rendering said device conductive for a desired period commencing at a point during the gradually rising portion of the variation in voltage on said grid, conduction of said device causing the potential on said grid to be rapidly reduced to said predetermined level and maintained at said level throughout said desired period.

3. In combination, a normally free-running blocking oscillator including an electron tube with anode and cathode and having a control grid transformer-coupled to said anode which undergoes a periodic variation of voltage at a natural frequency, a voltage source of predetermined potential below the cut-off potential of said tube, a diode connecting said voltage source to the grid of said tube to cause a portion of each cycle of said periodic variation of voltage to start at and increase gradually from said predetermined potential to the cut-on potential of said tube followed by a rapid change in potential to a level below said predetermined level, said voltage source and diode being operative rapidly to return the potential on said grid from said last-mentioned level to said predetermined level, and means for synchronizing said oscillator including a normally non-conducting discharge device connected from said control grid to a point of reference potential, and means for rendering said device conductive for a desired period commencing at a point during said gradually increasing portion of the variation in voltage on said grid, conduction of said device causing the potential on said grid to be rapidly returned to said predetermined level and maintained at said level for the remainder of said desired period, whereby at the termination of said period said gradually increasing portion of said periodic variation starts from said predetermined level.

4. A blocking oscillator circuit comprising, a first electron tube having anode, cathode and grid electrodes, a transformer coupling the anode of said first tube to the grid of said first tube, a timing circuit including a capacitor connected to said control grid and operative in conjunction with said first tube and transformer to cause said control grid to undergo a periodic variation in voltage of which a portion in each cycle rises gradually from below the cut-off potential of said first tube to a higher potential where said first tube is turned on followed by an abrupt change in potential to a lowermost level well below said cut-off potential, a voltage source having a predetermined potential intermediate said lowermost potential and said cut-off potential, a diode connected between said voltage source and the grid of said first tube and operative rapidly to discharge said capacitor from said lowermost level to said predetermined level whereby said portion rises from said predetermined level, and means for synchronizing said blocking oscillator including a second normally non-conducting electron tube having anode, cathode and grid electrodes, means connecting the anode of said second tube to the grid of said first tube and the cathode of said second tube to a source of reference potential, and a source of rectangular synchronizing pulses coupled to the grid of said second tube, said second tube being rendered conductive upon application and for the duration of a rectangular pulse, initiation of conduction of said second tube at point during the gradually rising portion of the variation in potential on the grid of said first tube causing the voltage of the grid of said first tube to be rapidly returned to said predetermined potential and maintained at said predetermined potential for the duration of said rectangular pulse.

5. A blocking oscillator circuit comprising, a first electron tube having anode, cathode and grid electrodes, a transformer having first and second windings, means connecting said first and second windings in circuit with the anode and grid of said tube, respectively, a parallel resistor-capacitor timing circuit connected from the grid of said tube to a point at ground potential, a source of voltage having a predetermined potential below the cut-off potential of said first tube, a diode connected between said source of potential and said timing circuit, a second electron tube having anode, cathode and grid electrodes, means connecting the anode of said second tube to the junction of said diode and said timing circuit, means normally biasing said second tube to be non-conducting, and a source of rectangular pulses connected to the grid of said second tube and arranged to apply rectangular pulses to said grid to render said second tube conductive for the duration of said pulses, conduction of said second tube causing the potential on the grid of said first tube to be rapidly returned from the level extant at the time of application of the pulse to said predetermined potential and maintained at said predetermined potential.

References Cited in the file of this patent

UNITED STATES PATENTS 2,616,048 Rubin ---------------- Oct. 28, 1952

OTHER REFERENCES

"Waveforms" by Chance et al., vol. 19, Radiation Laboratory Series, 1st edition 1949, published by McGraw-Hill Book Co., N.Y., page 224.